Patented Dec. 4, 1923.

1,476,562

UNITED STATES PATENT OFFICE.

WILBUR L. WRIGHT, OF FULTON, NEW YORK.

RENDERING PAPER MATERIAL AND THE LIKE GREASE AND WATER PROOF.

No Drawing.   Application filed May 22, 1920. Serial No. 383,424.

*To all whom it may concern:*

Be it known that I, WILBUR L. WRIGHT, a citizen of the United States of America, and resident of Fulton, Oswego County, State of New York, have invented certain new and useful Improvements in and Relating to Rendering Paper Materials and the like Grease and Water Proof, of which the following is a specification.

This invention relates to certain improvements in the art of rendering paper material and the like grease and moisture proof; and the objects and nature of the invention will be readily understood by those skilled in the art in the light of the following explanation of what I now believe to be the preferred expression and embodiment of my invention.

An object of the invention is to provide paper material embodying a grease proof barrier that will also act as a barrier against passage of moisture.

With these and other objects in view, my invention embodies paper material impregnated or coated with a compound insoluble in grease, and that will also serve as a barrier against passage of moisture.

My invention also contemplates subjecting any suitable grease proofing body or coating to the action of some suitable agent that will act to so bind together or consolidate the grease proofing substance on or in the paper material as to render such substance capable of resisting the passage of moisture as well as grease from one side of the paper material to the other.

I prefer to accomplish this water proofing result by the coagulating action of a suitable coagulant, for instance, such as acetic acid. The coagulant acts to bind molecules and fibers together and render the barrier insoluble in water, and hence render the paper material impervious to moisture.

My invention is applicable to various paper-material grease proofing compounds, particularly those comprising an adhesive, gelatinous or body forming solution embodying one or more ingredients to maintain the flexibility of the coating or filling formed on or in paper material by the application of the compound thereto.

Such compounds can comprise a solution of casein, gelatine or other suitable adhesive, and glycerine or an emulsified oil usually a vegetable oil. Where gelatine is employed the gelatine and glycerine (or soluble oil) are dissolved in water and the resulting compound is applied hot to the paper material to form a flexible coating thereon that acts as a barrier against the passage of grease.

The ingredients can be employed in approximately the proportions of gelatine from two to three hundred parts more or less; glycerine or oil from ten to one hundred parts more or less, and water somewhere about one thousand parts more or less.

Where casein is used instead of gelatine, the proportion will be about as above, but a suitable alkali or the like, such as ammonia will be added to aid in dissolving the casein. The compound embodying casein can be applied to the paper material either hot or cold.

Other ingredients can be included to perform added functions in the compound.

These compounds are usually applied in any suitable manner or by any suitable means to form coatings on the inner surfaces of paper containers, for instance, containers for food products.

The compounds can also be added to the paper stock or fibrous material in the process of making paper, so that the finished paper will be impregnated with a flexible body that forms a barrier against passage of grease. Such grease barrier forming flexible bodies or coatings, however, are generally soluble in water, and it is the purpose of my invention to so change the nature thereof (whether formed by the compounds hereinbefore noted or by other compounds), as to enable such bodies to act as barriers against the passage of moisture.

This result in the matter of water proofing the grease proof barrier, is attained by subjecting the grease proofed paper containers (or the grease-proofed paper material) to acetic acid fumes. In other words after the paper material or the paper containers have been coated with the grease proofing compound, such treated paper material or containers are placed in a closed chamber and subjected to the action of acetic acid fumes for a suitable length of time, say for about thirty minutes. The acetic acid solution in the chamber (out of contact with the paper material and containers) is usually subjected to heat to accelerate the generation of fumes. This acid acts on the grease proof coating as a coagulant to render the same insoluble in water.

While I have given examples of grease proofing compounds, yet I do not wish to limit my invention to the particular compounds named, as I wish to broadly claim my invention in connection with all paper and like material grease proofing compounds and coatings or bodies to which it is applicable.

What I claim is:—

1. A paper container interiorly coated by a grease proofing composition coagulated by acetic acid fumes to render the same moisture proof.

2. Paper material embodying a grease proof composition that includes an ingredient rendered moisture proof by the action of acetic acid fumes.

WILBUR L. WRIGHT.